United States Patent
James

(10) Patent No.: US 6,481,894 B1
(45) Date of Patent: Nov. 19, 2002

(54) PITCH BEARING

(75) Inventor: Frank O. James, Girard, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/791,335

(22) Filed: Feb. 23, 2001

(51) Int. Cl.⁷ .............................................. F16C 23/04
(52) U.S. Cl. ...................... 384/202; 384/271; 384/272
(58) Field of Search ................................ 384/221, 202, 384/199, 200, 201, 230, 231, 235, 238, 271, 272, 273, 290, 535, 536, 215; 267/150, 151, 152

(56) References Cited

U.S. PATENT DOCUMENTS

| | | | | |
|---|---|---|---|---|
| 3,610,774 A | * | 10/1971 | Mouille | 416/138 |
| 4,053,034 A | * | 10/1977 | Katzer | 188/206 R |
| 4,063,787 A | * | 12/1977 | Bakken et al. | 267/282 |
| 4,142,833 A | | 3/1979 | Rybicki et al. | 416/134 A |
| 4,257,739 A | * | 3/1981 | Covington et al. | 416/134 A |
| 4,286,827 A | | 9/1981 | Peterson et al. | 308/26 |
| 4,304,502 A | * | 12/1981 | Stratienko | 403/370 |
| 4,435,097 A | | 3/1984 | Peterson | 384/221 |
| 4,657,090 A | * | 4/1987 | Geczy | 175/107 |
| 4,765,758 A | * | 8/1988 | O'Donnell et al. | 267/141.1 |
| 4,810,105 A | | 3/1989 | Arlott et al. | 384/97 |
| 4,895,354 A | | 1/1990 | Byrnes | 267/141.1 |
| 4,907,814 A | * | 3/1990 | Foster | 280/104 |
| 4,909,641 A | | 3/1990 | McKenzie | 384/536 |
| 4,927,275 A | | 5/1990 | Lawson | 384/117 |
| 5,028,152 A | | 7/1991 | Hill et al. | 384/557 |
| 5,120,195 A | * | 6/1992 | Schmaling et al. | 384/221 |
| 5,215,382 A | | 6/1993 | Kemeny | 384/36 |
| 5,251,986 A | * | 10/1993 | Arena | 384/208 |
| 5,452,833 A | | 9/1995 | Hutter | 226/194 |
| 5,601,408 A | * | 2/1997 | Hunter et al. | 267/141.1 |
| 5,904,010 A | | 5/1999 | Javid et al. | 52/167.7 |
| 5,961,219 A | * | 10/1999 | Maughan | 384/220 |
| 6,053,489 A | * | 4/2000 | Enke | 267/141.3 |
| 6,238,477 B1 | * | 5/2001 | von Ammon et al. | 117/13 |

* cited by examiner

Primary Examiner—Jack Lavinder
Assistant Examiner—Benjamin A Pezzlo
(74) Attorney, Agent, or Firm—Michael M. Gnibus

(57) ABSTRACT

A bearing that includes a first bearing support member; a second bearing support member spaced from the first bearing support member, the first and second bearing support members each having a first end and a second end; and a resilient member between the first and second bearing support members, the resilient member having a radial thickness, the radial thickness varying between the first and second ends of the bearing support members, and whereby the bearing wears substantially constantly during its useful life.

20 Claims, 4 Drawing Sheets

PITCH BEARING

FIELD OF THE INVENTION

The invention relates to a pitch bearing and more particularly the invention relates to a pitch bearing that includes a variable thickness resilient layer that produces bearing loading that promotes substantially constant bearing wear life.

BACKGROUND OF THE INVENTION

Helicopters include a rotor hub that is driven by a rotor shaft. A plurality of rotor blades are connected to the rotor hub, and each rotor blade is linked to the hub by a member frequently referred to by those skilled in the relevant art as either a pitch hinge or a pitch link. For purposes of this description the member shall be referred to as a pitch joint. Each pitch hinge is used to make adjustments to the pitch or angle of attack of the blades to control the amount of lift generated as the rotor blades are rotated by the rotor hub. Each pitch hinge includes a number of pitch bearings that support the pitch hinge when it experiences an applied shear force and moment as the rotor hub is rotated.

Turning now to the schematic representation of a conventional pitch hinge illustrated in FIG. 1, the pitch hinge 10 has an inner body 12 with an inboard end 14 where the pitch hinge connects to the rotor hub (not shown) and an outboard end 16 where the pitch hinge connects to the respective rotor blade (not shown). The pitch hinge body is enclosed by an outer housing 18 that directly connects the pitch hinge to the rotor hub and rotor blade assemblies. The housing is partially illustrated in FIG. 1 and the conventional means for connecting the housing to the rotor blade and to rotor hub are not illustrated.

A pitch hinge elastic center 20 is located between the inboard and outboard ends 14 and 16. Conventional pitch bearings 22' and 22" are respectively located at the inboard and out board body ends and serve to support the pitch hinge as it experiences reactionary loading and applied rotational moments during use. For purposes of this disclosure, the elastic center of the pitch hinge is the location along the body of the pitch hinge where the reactionary loading forces produce no rotation. There is an applied moment at the elastic center. The location of the elastic center is dependent on a number of variables including the application environment for the pitch hinge, loading experienced by the pitch hinge and also the configuration and type of bearings used to support loading to the hinge. The moment applied about the elastic center is represented in FIG. 1 at the elastic center 20 by arrow 26.

The inboard and outboard pitch bearings 22' and 22" are substantially similar and include inner annular bearing seat 28' and 28", outer annular bearing member 30' and 30" and annular resilient member 32' and 32" located between the inner and outer members. As shown in FIG. 1, the resilient member has a constant thickness as it extends axially along axis 25 between the inner and outer bearing members. The constant thickness is illustrated in the enlarged detail view FIG. 2 and is referred to in the Figure as "t". Each pitch bearing 22' and 22" is seated on a respective sliding bearing surface 23 and 27. During use, the bearing may be displaced in small axially directed distances along the sliding bearing surfaces.

When elastomeric bearings are loaded relative to elastic center 20 by applied moment 26, an unbalanced load reaction and differential stress/strain occur in constant thickness resilient layers 32' and 32". As shown in the schematic representation of body 12 and bearings 22' and 22" in FIG. 3, the loading at outer bearing ends 35A and 35B is greater than the loading at inner bearing ends 36A and 36B. The different effective loads are represented schematically in FIG. 3 by differing the lengths of the tails of the load arrows. The greatest loads have the longest tails and the smallest loads have the shortest tails. As shown by the schematic representation of the reaction load distribution in FIG. 3, the load reaction (pressure distribution) increases in the axial direction along axis 25 from end 36A, 36B to end 35A, 35B as one moves farther away from the applied moment 26. As a result, the inner and outer sleeves 28 and 30 will compress or pinch the elastomer layer 32 more at outer ends 35A and 35B than at the inner ends 36A and 36B. causing the outer portions of the bearing sleeves to wear out prematurely. The uneven load distribution provides uneven wear on the bearings and causes the outer portions of the bearing sleeves 23 and 27 to wear out prematurely. The portions of bearing surfaces 23 and 27 at ends 35A and 35B that experience the greatest loading wear out sooner than the portions of the bearing surfaces at ends 36A and 36B.

The elastomer portions at ends 36A and 36B wear out over period of use that is longer than the period it takes for elastomer portions at ends 35A and 35B to wear out. In order to maximize the useful life of the pitch bearings 22' and 22" it would be desireable to provide constant or even wear of the sliding bearing surface of each of the pitch bearings.

The foregoing illustrates limitations known to exist in present devices and methods. Thus, it is apparent that it would be advantageous to provide an alternative directed to overcoming one or more of the limitations set forth above. Accordingly, a suitable alternative pitch bearing is provided including features more fully disclosed hereinafter.

SUMMARY OF THE INVENTION

In one aspect of the present invention this is accomplished by providing an elastomeric bearing which produces substantially constant bearing wear along the length of the sliding bearing surface. The bearing of the present invention comprises a bearing that includes a first bearing support member; a second bearing support member spaced from the first bearing support member, the first and second bearing support members each having a first end and a second end; and a resilient member between the first and second bearing support members, the resilient member having a thickness, the thickness varying between the first and second ends of the bearing support members, and whereby the bearing provides for constant bearing wear along the length of the bearing. The bearing may be a pitch bearing for use in a pitch hinge in a helicopter or may be used in an articulated vehicle.

In the bearing of the present invention the thickness of the resilient member varies linearly between the first and second bearing ends. Depending on the bearing loading the thicker end of the resilient member may be located at either the first or second bearing end. In the present invention bearing, the first bearing support member, the second bearing support member and the resilient member are annular and the thickness of the resilient member varies in the radial direction between the first and second ends. The first and second bearing support members have inner surfaces that are tapered inwardly and converge at the first end and the taper defines an angle that is between four and six degrees.

The foregoing and other aspects will become apparent from the following detailed description of the invention

DETAILED DESCRIPTION OF THE PREFERRED EMBODIMENTS

Figure 1:
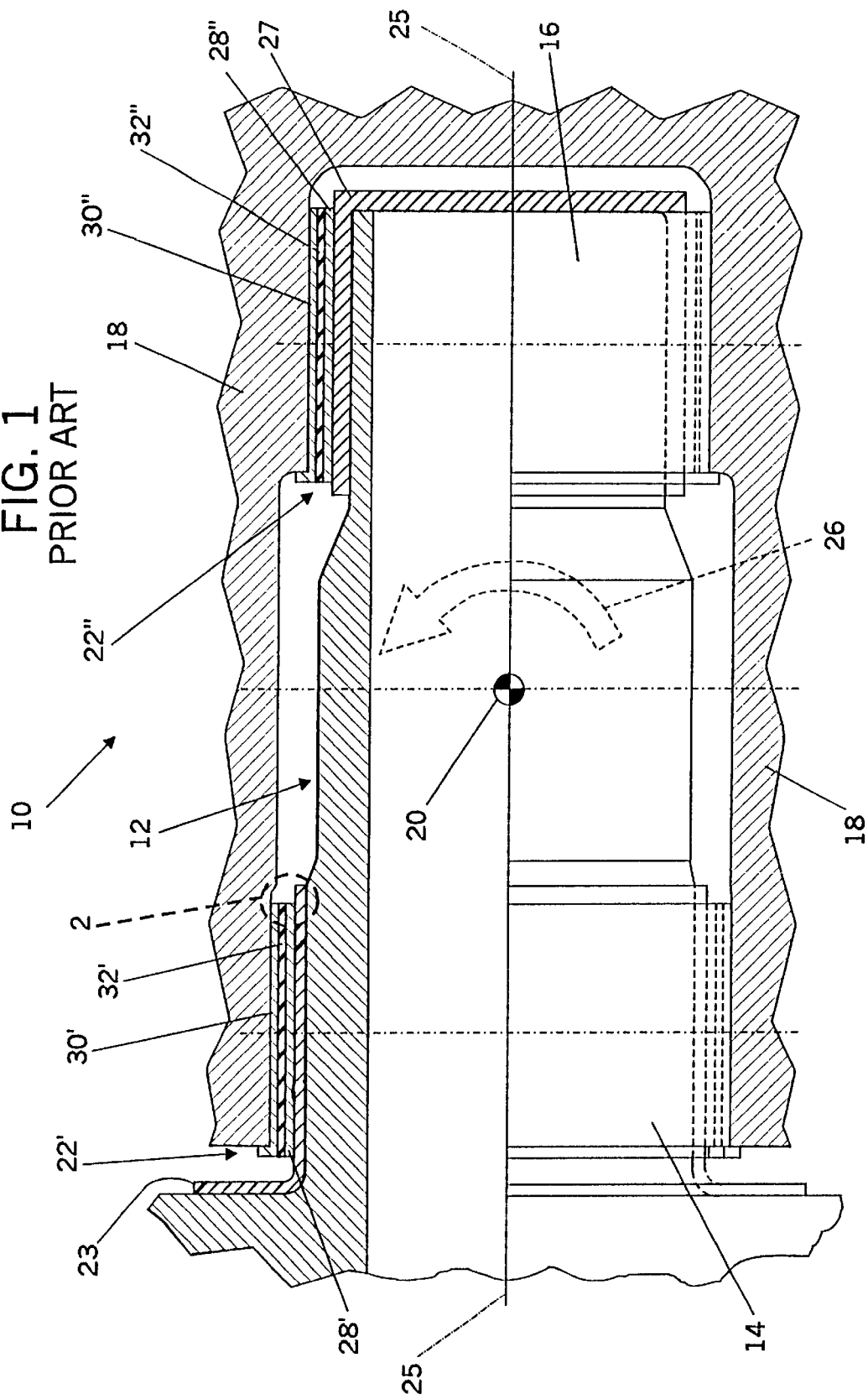
FIG. 1 is a partial longitudinal sectional view of a pitch hinge that includes prior art pitch bearings at the inboard and outboard ends of the pitch hinge.

Now turning to the drawing figures wherein like parts are referred to by the same numbers in the several views, FIGS. 4–8 illustrate the pitch bearing of the present invention included in pitch hinge 40. The bearing of the present invention provides means for producing substantially constant bearing wear life along the length of the bearing.

It should be understood that although the pitch bearing of the present invention 42' and 42" is shown and described for use in a pitch hinge, the present invention may be used in a variety of suitable applications including the class of articulated vehicles comprising tractors, trucks earthmovers or the like.

Figure 2:
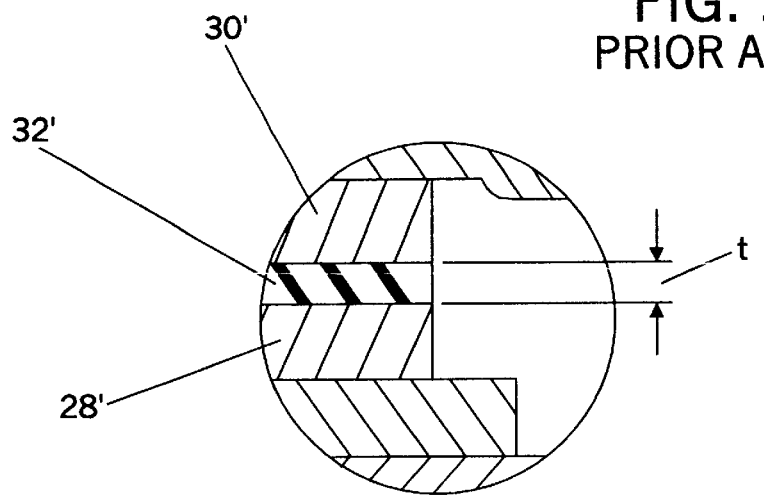
FIG. 2 is an enlarged view of the portion of FIG. 1 enclosed by the dashed font circle identified as 2 in FIG. 1.
Figure 3:
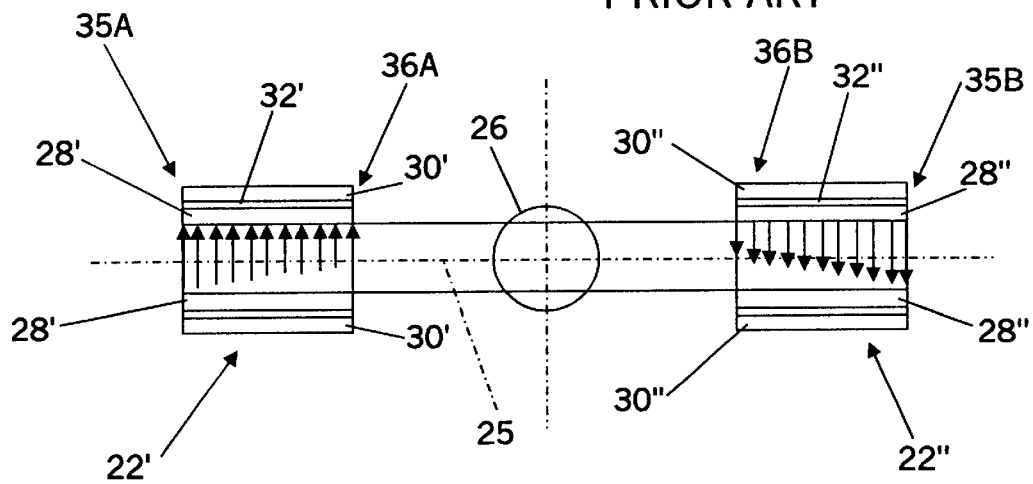
FIG. 3 is a schematic representation of conventional pitch bearings illustrating the unbalanced reaction loads at the inboard and outboard pitch bearings.

The pitch hinge 40 includes many of the elements of prior art pitch hinge 10 previously described hereinabove in illustrated in FIGS. 1–3, including body 12 with axis 25, and an elastic center 20 between the inboard and outboard ends 14 and 16 and a housing 18 that substantially encloses the body. Although the terms inboard and outboard are included in the reference names of body ends 14 and 16, the ends 14 and 16 could also respectively be identified as "inner" and "outer" ends or "first" and "second" ends, and should not be limited to an application that includes inboard and outboard locations or directions.

Figure 4:
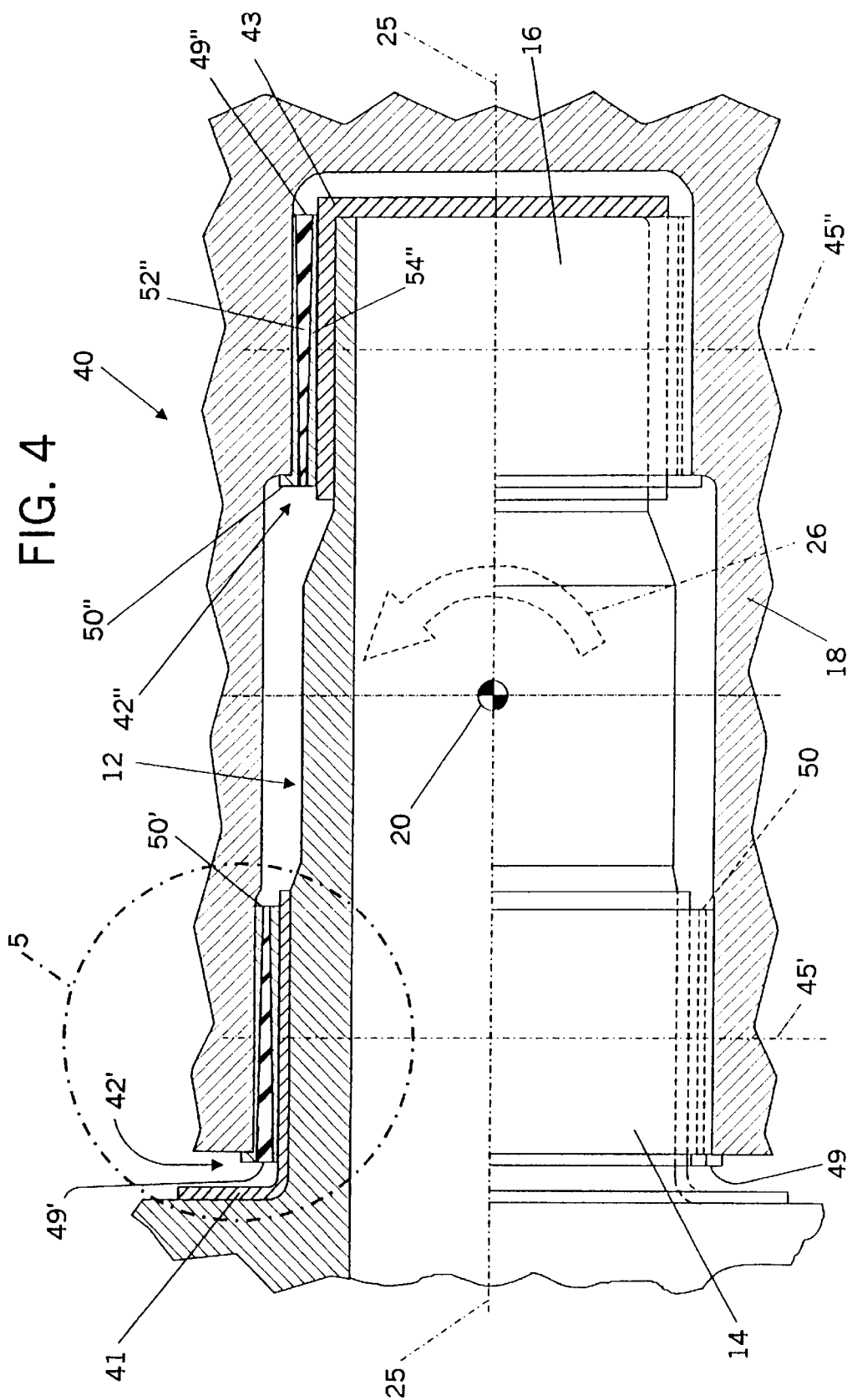
FIG. 4 is a partial longitudinal section view of a pitch hinge that includes the pitch bearings of the present invention at the inboard and outboard ends of the pitch hinge.

Inboard and outboard bearing sleeves 41 and 43 are located along the body at the inboard and outboard body ends 14 and 16 and pitch bearings 42' and 42" of the present invention are seated on the respective bearing sleeves 41 and 43 that define sliding surfaces. The sleeves are shown in FIG. 4 and are similar to sleeves 23 and 27. The bearings are substantially the same and include an annular first bearing support member or bearing seat 44', 44" in contact with the respective sleeve; an annular second bearing support member 46', 46" spaced from the first bearing support member radially outwardly along radial or lateral axis 45',45" and a resilient member 48', 48" located between the first and second support members. See FIGS. 4 and 5. The housing 18 is supported by the second bearing support members 46', 46".

Because bearings 42' and 42" are substantially the same, for clarity purposes, as the description proceeds only bearing 42' will be described. For reference purposes, when reviewing the drawing Figures, for elements that are included in the first and second bearings of the present invention in the first bearing 42' the elements are identified by a reference number and a single prime and the equivalent element in the second bearing 42" is identified using the same reference number used to identify the element in the first bearing along with a double prime marking adjacent the reference number.

The bearing support members 44' and 46' may be made from any suitable material however it is preferred that the members be made from stainless steel. The resilient member may also be made from any suitable resilient material however for purposes of describing the preferred embodiment of the invention the member 48' is made from a natural rubber and is attached to the bearing support members 44' and 46' using a conventional adhesive such as CHEMLOK® Adhesive 250 supplied by Lord Corporation of Erie, Pa.

Figure 5:
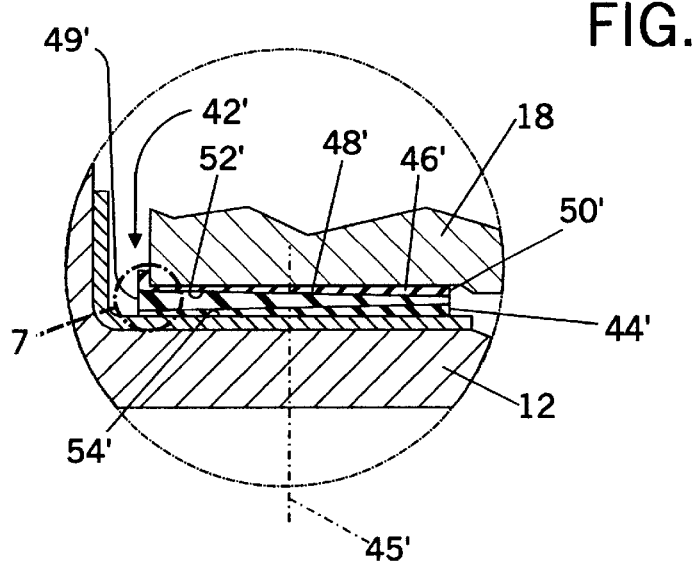
FIG. 5 is an enlarged view of the portion of FIG. 4 enclosed by the dashed font circle identified as 5 in FIG. 4.

Each pitch bearing support member has a first end 49' and a second end 50'. As shown in FIG. 5, the inner surfaces 52' and 54' of the first and second bearing support members diverge as the surfaces extend along axis 25 from the second end 50' to the first end 49'. The slope or angle of taper is constant for each surface 52', 54' and the angle of taper is most preferably between 4° and 6°. This angle is identified as 56 in FIG. 7. It should be understood that the bearing support member surfaces 52 and 54 may be given any suitable angle 56 and that the degree value of the angle is dependent on a number of variables including, but not limited to, the distance from the elastic center, the magnitude of the reactionary loading, the moment applied at the elastic center 20 and also the material comprising resilient member 48.

Figure 8:
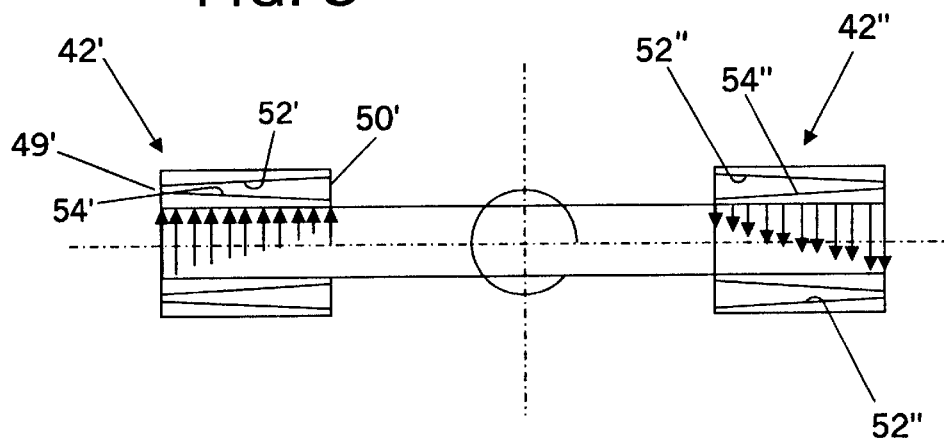
FIG. 8 is a schematic representation of the pitch bearings of the present invention illustrating an alternate orientation for the inboard and outboard pitch bearings.

FIG. 8 schematically illustrates an alternate bearing configuration. In the alternate configuration, the inner surfaces 52' and 54' converge as the surfaces extend along axis 25 from the second end 50' to the first end 49'.

Although the resilient member 48' as disclosed includes a constant or linearly slope surface 57, if required, the member and also surfaces 52 and 54 may comprise non-linearly sloped surfaces.

Turning now to the resilient member 48', as shown in FIGS. 4 and 5, the annular resilient member has a radial thickness that is variable between the ends of the bearing 49' and 50'. As shown in FIGS. 4 and 5, radial dimension of resilient layer 48' at end 49' is greater than the radial dimension of the resilient layer at end 50' along the direction of axis 45' and in this way, the longitudinally extending member surfaces diverge in a linear manner between the ends 49' and 50'. The bearing of the present invention 42' that includes variable thickness layer 48' provides constant bearing wear along the sleeves and bearing components and extends the useful life of the bearing 42'.

Figure 6:
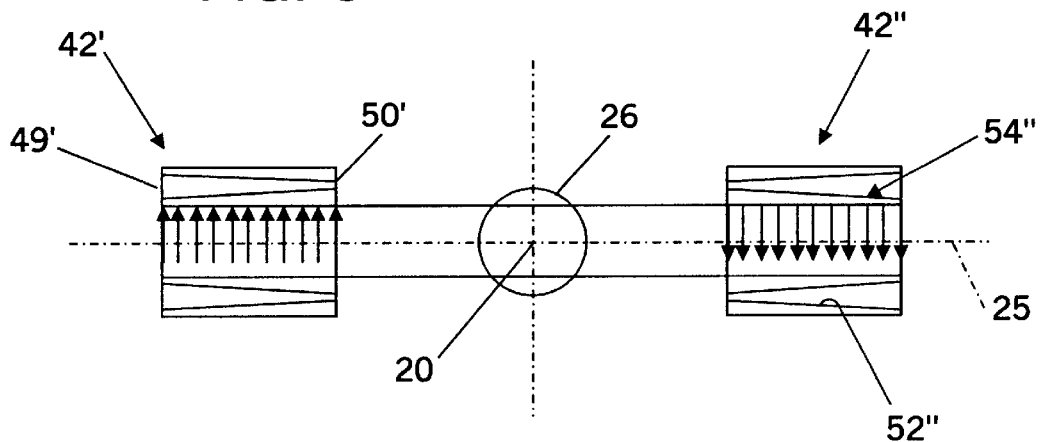
FIG. 6 is a schematic representation of the pitch bearings of the present invention illustrating the balanced reaction loads at the inboard and outboard pitch bearings.
Figure 7:
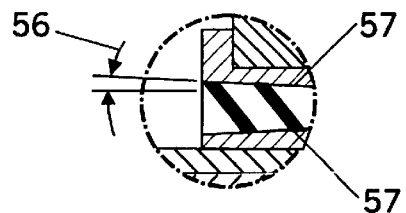
FIG. 7 is an enlarged view of the portion of FIG. 5 enclosed by the dashed font circle identified as 7 in FIG. 5.

As shown in FIG. 6, when the portion of the member 48' with the greatest radial dimension is located at end 49', as the body is loaded and moment 26 is applied at the elastic center 20, the reactionary load along the pitch bearings is substantially constant between ends 49' and 50'. The evenly distributed reactionary load is represented by the arrows with tails that are substantially the same length. In this way, the pitch bearing resilient members will wear more constantly and evenly than prior art pitch bearings under similar loading conditions. As a result, it is expected that the pitch bearings of the present invention will have a longer useful life than prior art pitch bearings. This configuration of the resilient member is required when the axial forces are small and the shear loads and resultant moments are of larger magnitude.

Under alternative loading scenarios, it might be necessary to orient the resilient layer 48' in the manner illustrated schematically in FIG. 8 with the portion of the member 48' with the greatest radial dimension located at end 50' and the portion of the member 48' with the minimum radial dimension located at end 49'. This type of configuration is most useful when it is necessary to react to axial loads generally along axis 25. Under such loading, the axial loads are greater than the applied moments and shear loads.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. A bearing comprising:
   (g) a first bearing support member, having a first inner surface;
   (h) a second bearing support member spaced from the first bearing support member, the second bearing support member having a second inner surface, the first and second bearing support members each having a first end and a second end, the first and second bearing support members having a thickness at one bearing support member end that is greater than the thickness at the other bearing support member end; and
   (i) a resilient member located between the first and second bearing support members, the resilient member having a thickness, the thickness varying between the first and second ends of the bearing support members, and whereby the bearing provides for constant bearing wear along the length of the bearing.

2. The bearing as claimed in claim 1 wherein the bearing is a pitch bearing.

3. The bearing as claimed in claim 1 wherein the thickness of the resilient member varies linearly between the first and second bearing support member ends.

4. The bearing as claimed in claim 1 wherein the thickness of the resilient member is greater at the first end of the bearing support members than at the second end of the bearing support members.

5. The bearing as claimed in claim 1 wherein the thickness of the resilient member is greater at the second end of the bearing support members than at the first end of the bearing support members.

6. The bearing as claimed in claim 1 wherein the first bearing support member, the second bearing support member and the resilient member are annular and the thickness of the resilient member varies in the radial direction between the first and second ends.

7. The bearing as claimed in claim 1 wherein the inner surfaces of the first and second bearing support members are tapered inwardly and converge at the first bearing support member end.

8. The bearing as claimed in claim 7 wherein the taper defines an angle that is between four and six degrees.

9. The bearing as claimed in claim 1 wherein the first and second bearing support members have inner surfaces that are tapered and converge at the second end.

10. The bearing as claimed in claim 9 wherein the taper defines an angle that is between four and six degrees.

11. A pitch hinge comprising:
    a) a body, the body having an elastic center;
    b) at least one pitch bearing located along the length of the body and loaded from the elastic center, the at least one pitch bearing comprising: a first bearing support member having a first inner surface; a second bearing support member having a second inner surface, the second bearing support member being spaced from the first bearing support member, the first and second bearing support members each having a first end and a second end, and each of the first and second bearing support members having a thickness at one end that is greater than the thickness at the opposite bearing support member end; and a resilient member between the first and second bearing support members, the resilient member having a thickness, the thickness varying between the first and second ends of the bearing support members, and whereby the bearing provides constant force distribution along the length of the pitch bearing when the pitch bearing is loaded.

12. The pitch hinge of claim 11 wherein the body includes an inboard end and an outboard end and a pitch bearing located at each of the body ends.

13. The pitch hinge as claimed in claim 11, the pitch hinge having an axis, the thickness of the resilient layer varying along the axis.

14. The pitch hinge as claimed in claim 13 wherein the thickness of the resilient layer varies linearly.

15. The pitch hinge as claimed in claim 14 wherein the thickness of the resilient layer at the first end is greater than the thickness of the resilient layer at the second end.

16. The pitch hinge as claimed in claim 14 wherein the thickness of the resilient layer at the second end is greater than the thickness of the resilient layer at the first end.

17. The pitch hinge as claimed in claim 11 wherein the at least one bearing is seated on a bearing sleeve.

18. The pitch hinge as claimed in claim 11 wherein there are two pitch bearings, each pitch bearing seated on a bearing sleeve.

19. The pitch hinge as claimed in claim 11 wherein the thickness of each bearing support member is greater at the first bearing support member end than at the second bearing support member end.

20. The pitch hinge as claimed in claim 11 wherein the thickness of each bearing support member is greater at the second bearing support member end than the first bearing support member end.

* * * * *